Figure 1:
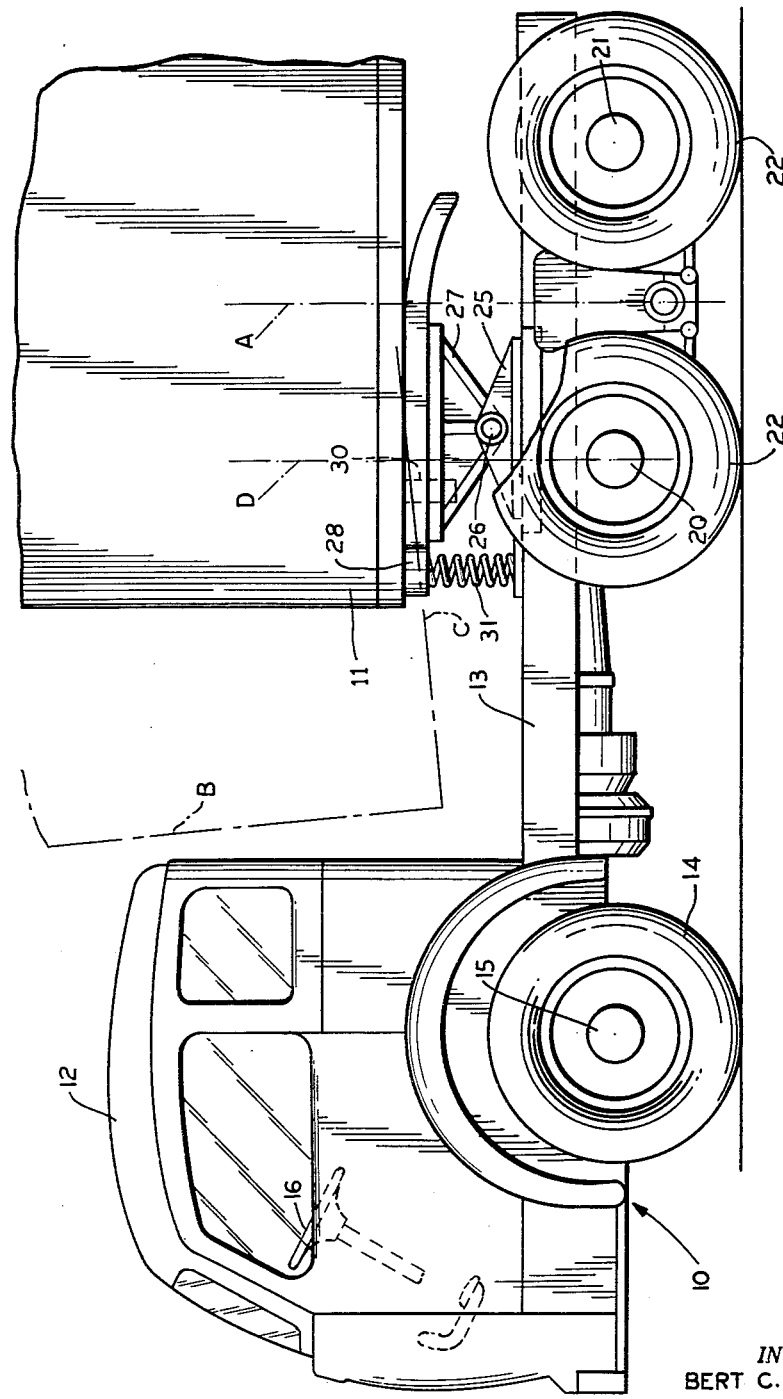

May 22, 1962   B. C. HARRIS   3,035,855
FIFTH WHEEL CONSTRUCTION
Filed July 12, 1961   2 Sheets-Sheet 1

INVENTOR.
BERT C. HARRIS
BY
Watts, Edgerton, Pyle & Fisher
ATTORNEYS.

May 22, 1962 B. C. HARRIS 3,035,855
FIFTH WHEEL CONSTRUCTION
Filed July 12, 1961 2 Sheets-Sheet 2

INVENTOR.
BERT C. HARRIS
BY
Watts, Edgerton, ...
ATTORNEYS.

United States Patent Office 3,035,855
Patented May 22, 1962

3,035,855
FIFTH WHEEL CONSTRUCTION
Bert C. Harris, Chagrin Falls, Ohio, assignor to White Motor Company, Cleveland, Ohio, a corporation of Ohio
Filed July 12, 1961, Ser. No. 123,579
7 Claims. (Cl. 280—439)

This invention relates to motor vehicles and more specifically to a highway tractor-trailer combination and a mechanism for connecting them together.

Modern highway vehicles and particularly tractor-trailer combinations are subject to many laws and regulations which restrict their size. Usually these restrictions limit the overall length and the weight imposed on each axle.

It is customary to use a mechanism known as a fifth wheel and a coacting king pin to firmly connect the tractor to the trailer while permitting relative pivotal movement of the two about the vertical axis of the king pin. Customarily, the king pin is secured to the trailer while the fifth wheel is pivotally connected to the tractor for pivotal movement about a horizontal and transverse axis. With prior known constructions, it has been common to find that if the fifth wheel is positioned sufficiently far forward to maintain a given tractor-trailer combination within the applicable regulations as to length, the load which could legally be carried was limited. The load was limited because even though the total number of axles present was more than adequate to carry a greater load, the load was not uniformly distributed over all of these axles. The forward positioning of the fifth wheel to shorten the length would cause an undue portion of the load to be imposed on the front axle of the tractor. The fact that the front axle has only two road wheels while normally the other axles will have four is a factor which contributes to this overloading of the front axles. In addition to the problem of legal load limits, another disadvantage resulted from this overloading of the front axle. Since the front axle is usually the steering axle, a tractor with an overloaded front axle is very difficult to steer. Further, an overloaded steering mechanism is placed under undue strain and excessive wear and damage can result.

With the present invention it is possible for a given tractor to haul a trailer which is as long as legally possible while loaded with a maximum load. This is accomplished by providing a fifth wheel construction in which the king pin is positioned forward of the cross or pivot pin which connects the fifth wheel to the tractor. Since all loads imposed by the trailer on the tractor are imposed along the axis of the pivot pin, the loading is shifted rearwardly as compared with the customary prior art practice where the pivot pin axis was in the vertical plane of the king pin axis. It is also the converse of the invention described and claimed in my copending application for patent, Serial No. 807,693, filed April 20, 1959, and entitled, "Fifth Wheel Construction," now United States Patent No. 3,002,766 wherein a mechanism for imposing loading on the front wheels is disclosed.

According to this invention the king pin is, as has been indicated, positioned forward of the cross pin. Since the king pin connection will be at approximately the center of gravity of the fifth wheel, this construction positions the cross pin rearwardly of the center of gravity. To permit connection and disconnection of the tractor and trailer, a means is provided to urge the forward end of the fifth wheel upwardly as is necessary for a tractor-to-trailer coupling operation. This means, in the device disclosed takes the form of a pair of coil springs interposed between the fifth wheel and the frame. It will be recognized that other mechanisms such as other spring forms, counterbalancing, or hydraulic actuators can be substituted to accomplish the function of the coil springs. The springs are, however, preferred because they are a simple, inexpensive, readily available, and dependable means of accomplishing the elevation of the forward end of the fifth wheel while at the same time permitting standard commercially available fifth wheels to be used to effectuate the advantages of this invention.

Expressed one way, this invention permits loading of the front wheels to be reduced, as compared with prior mechanisms of similar dimensions. Expressed another way, it is possible to shorten the overall length as compared with prior vehicles of similar size, without overloading the front wheels.

Accordingly, the principal object of this invention is to provide a novel and improved tractor-to-trailer connection which will minimize the loading of the front wheels of the tractor.

Another object of this invention is to mount the king pin forward of the pivotal axis of the fifth wheel and also forward of a vertical plane including the axis of the rear wheels in order to minimize the loading on the front wheels while maintaining the king pin as far forward as possible, thus avoiding overloading of the front wheels of the tractor.

Figure 2:
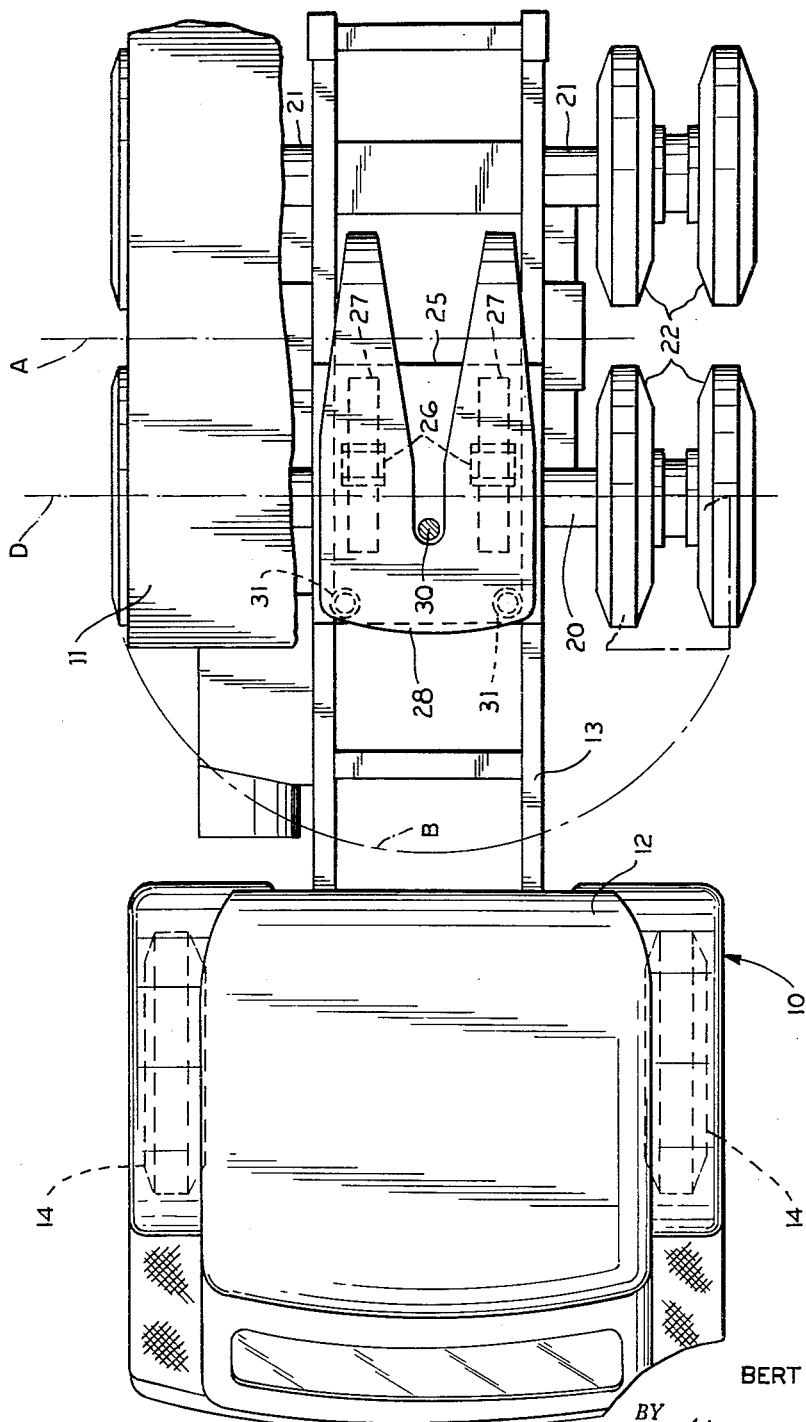

Other objects and a fuller understanding of the invention may be had by referring to the description and claims taken in conjunction with the drawings in which:

FIGURE 1 is a side elevational view of a highway tractor and portion of a trailer incorporating the mechanism of this invention; and, FIGURE 2 is a top plan view of the device of FIGURE 1 with portions broken away and removed for clarity.

Referring to the drawings, a highway tractor is shown at 10. A foreshortened plan view of the forward part of a highway trailer 11 is shown in FIGURE 1. The trailer may be of any of the usual types including road wheels positioned toward the rear of the trailer.

The tractor 10 includes a cab 12 mounted on a frame 13. The tractor also has forward road wheels 14. The forward road wheels 14 are steering wheels mounted on forward steering axles 15. The steering axles 15 are controlled in the usual manner by a steering wheel 16.

The tractor disclosed in the drawings is of the type referred to usually as a six-wheeler. The term six-wheeler is applied in the truck industry to a tractor having two rear axles. It is often applied to a truck even though there are dual wheels on each of the rear axles. Thus, in reality, the truck shown may have ten road wheels though it is, as indicated, often referred to as a six-wheeler. The tractor, then, has a forward rear axle 20 and a rearward axle 21. Rear road wheels 22 are secured to the rear axles.

The rear axles and the assembly supporting them are symmetrical about a vertical plane A. This plane A is usually known as a boggie line or a boggie plane. The boggie plane A, then, is a vertical plane midway between the axes of the two rear axles 20, 21.

At the rearward part of the tractor near the rear axle assembly, fifth wheel supporting plates 25 are secured to the frame 13. A pair of cross pins 26 are mounted in the fifth wheel support plates 25. The cross pins have an axis which is horizontal and transverse to the tractor. A pair of spaced fifth wheel supporting plates 27 are pivotally mounted on the cross or pivot pins 26. The fifth wheel supporting plates 27 carry a fifth wheel plate 28 which may be of any of the usual types. The fifth wheel plate 28 includes a means to removably connect a trailer king pin 30 to the fifth wheel. The king pin 30 is fixed to the trailer 11 so that the removable connection of the king pin to the fifth wheel connects the tractor and trailer together.

As will be seen by an examination of the drawing, the fifth wheel plate 28 is positioned such that the king pin 30 is forwardly of the cross pin 26. Since the king pin is positioned forwardly of the cross pin, the center of gravity of the fifth wheel plate 28 will also be forward of the axis of the cross pin 26. Since the center of gravity of the fifth wheel plate 28 is forward of the axis of the pivot pin 26, a means must be provided to maintain the fifth wheel with its forward end elevated when no trailer is connected. This means is required to position the fifth wheel in a position where a trailer can be facilely connected. It is also needed to facilitate the disconnection of a trailer. One such means is the means shown in the drawings. This means is a pair of coil springs 31 interposed between the forward end of the fifth wheel plate 28 and the frame 13.

Since the fifth wheel 28 is, as compared with prior art constructions, further forward for any given cross pin location, a first blush examination would suggest that tractor-trailer clearance might be a problem. To demonstrate the fact that adequate clearance is obtained even though overall length is shortened again with a given cross pin location and as compared with prior practice, the lines B and C are shown in the drawings.

In the drawings, the line B designates the relative position of a forward corner of the trailer if the tractor simultaneously negotiates a curge and goes up a hill. Thus, the line B of FIGURE 1 shows the relative tilting of the corner of the trailer and the tractor. The line B of FIGURE 2 is a curve generated by the forward corners of the trailer relative to the tractor. The line C, on the other hand, designates the forwardmost positioning of the bottom of the trailer if the tractor is simultaneously negotiating a curve and a hill.

Thus, with the construction shown, adequate clearance is provided no matter what kind of terrain is negotiated. Even though this is the case, it may be minimum clearance with the trailer positioned as far forward as is possible while still obtaining tractor-trailer clearance. Even with the trailer positioned as far forward as possible and the king pin as shown in FIGURE 1 forward of a vertical plane D in which is located the axis of the foremost rear axle 20, the front axles 15 will not carry an excessive share of the total load. The front axles will not have an excessive share because, even through the king pin is forward of this vertical plane D, the cross pin is rearward of it and between this vertical plane D and the boggie plane A. The load imposed by the trailer on the tractor is imposed through the cross pin. Since the load is imposed by the cross pin, it is imposed between the planes A–D and therefore between the two rear axles. With the prior constructions, on the other hand, the cross pin has been positioned below the king pin and the load has been, in the relative tractor-trailer positioning shown, imposed on the forward axles to an extent which overloads them.

While the invention has been described with a great deal of clarity and detail, it is believed that it essentially comprises a fifth wheel construction used in combination with a tractor-trailer wherein the cross pin is rearward of the king pin and the forward axles while at the same time forward of the boggie line.

While the invention has been described with a certain degree of particularity in its preferred form it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a tractor assembly for pulling a highway trailer the combination of, a frame, front and rear road wheels secured to and supporting the frame, the foremost of said read wheels being disposed for rotation about an axis, a fifth wheel pivotally connected to said frame for pivotal movement relative to the frame about an axis disposed in a vertical transverse plane forward of the rearmost road wheels, and said fifth wheel including means to connect a trailer king pin between said vertical plane and said front road wheels.

2. The device of claim 1 wherein a biasing member is interposed between the fifth wheel and the frame biasing the forward end of the fifth wheel upwardly.

3. In a tractor assembly for pulling a highway trailer the combination of, a frame, front axles connected to said frame, front road wheels mounted on said front axles, a rear axle assembly, rear road wheels mounted on the rear axle assembly, said assembly being symmetrically disposed with respect to a vertical plane which is parallel to said rear axle assembly, a fifth wheel pivotally connected to said frame for pivotal movement relative to the frame about an axis disposed in a plane between said front wheels and said vertical plane, and said fifth wheel including means to connect a trailer king pin, said means being disposed forward of said plane of pivotal movement.

4. A tractor-trailer combination comprising, a tractor including a frame and front road wheels connected to the frame, said tractor also including a rear axle means connected to the frame and rear road wheels connected to the rear axle means, hinge plates on said frame, a fifth wheel, a second hinge plate on the bottom of said fifth wheel, pins connecting said plate for vertical pivotal movement of said fifth wheel, a trailer on said fifth wheel, a king pin in said fifth wheel for the horizontal rotative movement of said trailer, said king pin being disposed forward of the pivotal connection of the fifth wheel and forward of the vertical centerline of said rear axle means.

5. A tractor-trailer assembly comprising, a tractor including a frame and front road wheels connected to the frame, said tractor also including rear axle means connected to the frame and rear road wheels connected to the axle means, said wheels being disposed to form a vehicle with a short wheel base, a fifth wheel on said frame, a pivotal connection between the fifth wheel and said frame for vertical movement of said fifth wheel, said pivotal connection being forward of a vertical plane through the center of said rear axle means, a trailer on said fifth wheel, and a king pin connected to the trailer and in said fifth wheel forward of said pivotal connection for said fifth wheel.

6. In a tractor for pulling a highway trailer, the combination of, a frame, front and rear axles carried by said frame, front and rear road wheels respectively connected to said front and rear axles, a cab connected to the forepart of the frame, a fifth wheel, a pivot pin connected to the frame and to the fifth wheel rearward of the center of balance of the fifth wheel, means connected to the fifth wheel and the frame and biasing the forward end of the fifth wheel upwardly, and said fifth wheel including means to connect a king pin forward of a vertical plane through the axis of the pivot and forward of said rear axle.

7. The device of claim 6 wherein the biasing means comprises at least one spring interposed between the fifth wheel and the frame forward of the pivot pin axis.

References Cited in the file of this patent

UNITED STATES PATENTS

| | | |
|---|---|---|
| 2,713,500 | Flynn | July 19, 1955 |
| 2,764,424 | Standing | Sept. 25, 1956 |
| 2,996,312 | Paul | Aug. 15, 1961 |
| 3,002,766 | Harris | Oct. 3, 1961 |